Oct. 30, 1928.
F. LÖSEL
1,689,735
LABYRINTH GLAND CONSTRUCTION
Filed Aug. 15, 1924
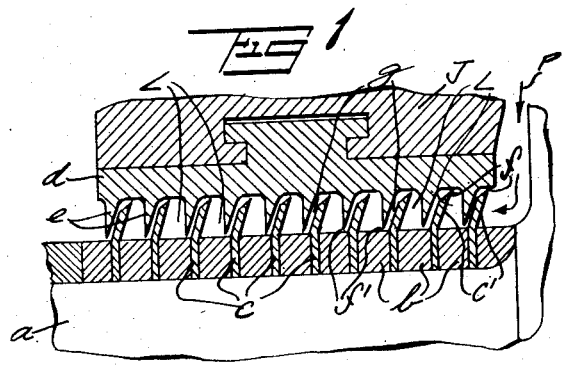
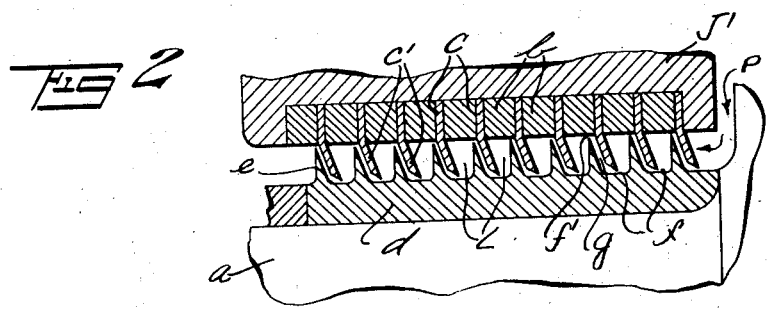
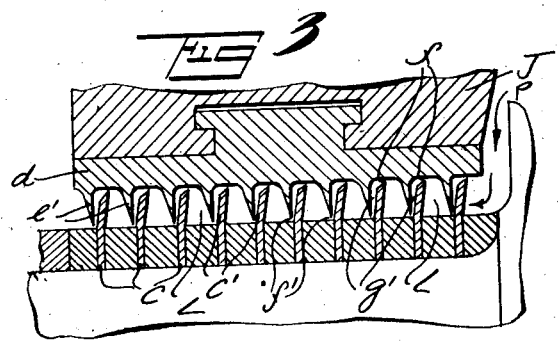
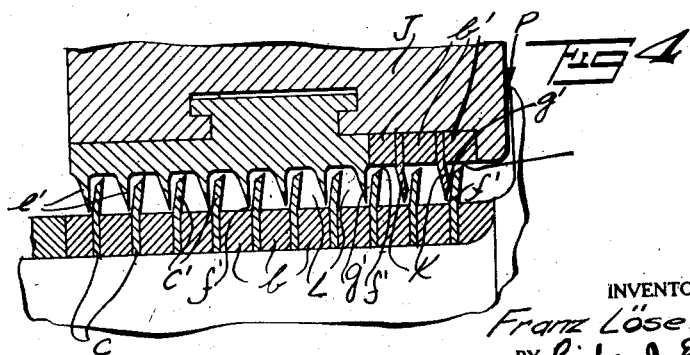
INVENTOR
Franz Lösel
BY Richard Eyre
ATTORNEY Patented Oct. 30, 1928.

1,689,735

UNITED STATES PATENT OFFICE.

FRANZ LÖSEL, OF BRUNN, CZECHOSLOVAKIA.

LABYRINTH GLAND CONSTRUCTION.

Application filed August 15, 1924, Serial No. 732,306, and in Austria October 5, 1923.

This invention relates to a novel method and gland construction and arrangement for sealing the relatively rotating parts of high pressure machines, and especially high pressure elastic fluid machines like steam turbines. The object of the invention generally is a novel method and gland construction and arrangement for high pressure turbines whereby a very effective seal is effected for the high pressure fluid and the seal is substantially unaffected during long continued wear and operation. To these ends I interpose in the path of the high pressure fluid a multiplicity of small expansion chambers separated by still smaller alternating fixed and pressure variable throttling clearances. More particularly I have devised a labyrinth gland construction so as to form relatively long side clearances such that the steam pressure upon one side of the gland elements functions to reduce the side clearances substantially on the opposite sides of these elements, thereby tending to throttle and form a more effective seal against the high pressure steam. Preferably the construction and arrangement are such that certain of the peripheral or radial and the side or axial clearances are automatically reduced by the steam pressure so as to form a series of double throttling points of pressure variable dimensions throughout the length of the gland assembly, while other radial clearances are fixed. Other novel features of the gland reside in the simple construction and easy assembly of the elements entering into the labyrinth assembly.

For a better understanding of the invention including the above indicated novel features of construction and operation and others which will hereinafter appear, reference may be had to the accompanying drawings forming a part of this application, wherein:

Fig. 1 is a sectional view through one section of a gland construction embodying my invention;

Fig. 2 is a similar view of a slight modification;

Fig. 3 is a similar view of a further modification, and

Fig. 4 is a similar view of a still further modification.

The particular embodiment herein exhibited shows my invention embodied in an axially disposed gland but it is also applicable to radially disposed glands. Referring to Fig. 1 I have illustrated a portion of a high pressure elastic fluid machine such as a steam turbine embodying a shaft $a$ and a gland housing or casing $j$ of conventional and usual form. The housing $j$ carries axially divided box rings $d$, the method of attachment of these members being in any suitable manner, as for example by means of the dovetail slot or groove connections indicated. The rings $d$ are provided with a series of rigid ring ribs $e$, the latter being of wedge-shape form and being inclined toward the left from the right angle position as indicated. Directly surrounding the shaft $a$ and rotating therewith are assembled a plurality of elastic rings $c$, preferably of a rustless material, the latter rings having their inner portions firmly gripped and anchored between the tightening and holding rings $b$. The rings $b$ are of just sufficient depth to leave small radial clearances between their outer peripheries and the inner peripheries of the ring ribs $e$ and the elastic rings $c$ have their outer portions $c'$ disposed in parallel relation to the ribs $e$ and forming with the rings $d$ small clearances $f$. Each ring $c'$ is arranged closely adjacent the immediately following rib $e$ so that in addition to the small clearances $f$ and $f'$ disposed respectively at the outer edges of the elastic rings $c$ and the inner edges or peripheries of the ribs $e$, there are side or axial clearances $g$ of relatively small dimensions between the closely adjacent ribs $e$ and the rings $c$ and on the opposite sides of the rings $c$ from the direction of application of steam pressure. The rings $c$ ($c'$) therefore divide the spaces between the ribs $e$ unequally so as to form expansion chambers L of relatively large dimensions followed by the throttle chambers or clearances $g$ of very small and relatively long dimensions. The steam entering from the right is forced to follow a zig-zag path as follows: outwardly in the expansion chambers L, through the radial clearances $f$, inwardly through the axial clearances $g$ and through the radial clearances $f'$, thence to the expansion chambers. These elements do not ordinarily touch under service conditions, but the pressure of the driving fluid indicated by the arrow $p$ which is applied as indicated from the right in Fig. 1, tends to automatically diminish both the throttle clearances $f$ about the peripheries of the rings $c$ and the side or axial clearances $g$ between the closely arranged rings. This is due to the slight elasticity of the rings $c$. The wearing, therefore, of the peripheral edges of the rings $c$ does not impair the gland seal since the series of small side or axial clearances $g$ still remain effective during long continued use. The clearances $f'$ are fixed, assuming rigidity of ribs $e$, and are observed to alternate with the pressure variable clearances $f$ and $g$.

The relatively low pressure variable throttle clearances $g$ also form relatively long radially extending friction and pumping means counteracting the leakage fluid flow. The friction and counteracting pumping action in these axially and also radially extending clearances $g$ take place to a relatively high degree due to the relatively small or narrow and long clearance openings $g$ between the adjacent rotating gland baffle rings $c'$ and stationary gland baffle rings $e$ and the small outer and inner radial clearances $f, f'$, and due to the relatively high counteracting forces obtained by rotating the gland baffle rings closely adjacent the side walls of the stationary gland baffle rings $e$ and the closing effect. Also, due to the closing effect of the long clearances $g$ obtained by increase in pressure and deformation of the elastic gland ring portions $c'$, the counteracting centrifugal forces in the small and long clearances $g$ are fully utilized to obtain a good sealing effect, and such clearances $g$ act therefore as combined throttle clearances, variable under pressure, and as friction and counteracting pumping clearances.

In the modification illustrated in Fig. 2 the ring boxes $d$ are carried by the rotating shaft $a$ instead of by the housing $j'$ and the securing or anchoring rings $b$ are carried by the housing or turbine casing. In this modification, as in the modification of Fig. 1, the ribs $e$ are slightly inclined toward the left and the inclined portion $c'$ of the elastic rings $c$ are arranged closely adjacent to and parallel with the inclined ribs $e$. This arrangement has the particular advantage over the modification of Fig. 1 that the ring clearances $f$ about the edges of the elastic rings $c$ are not only automatically reduced by the application of steam pressure in the direction of the arrow, but they have a smaller diameter than the similar clearances in Fig. 1 with the consequent reduction of steam leakage.

The modification exhibited in Fig. 3 is similar to the modification in Fig. 1, but differs therefrom in that the gland rigid ribs $e'$ are not disposed in a parallel position with reference to the inclined portions $c'$ of the elastic rings, but on the contrary are indicated as inclined slightly in the opposite direction. The axial clearances $g'$ are automatically reduced by the bending of the elastic portion $c'$ of the rings $c$ in the manner of the similar modes of operation of the Figs. 1 and 2, and similarly the steam pressure entering from the right tends to reduce the radial clearances $f$ about the outer edges of the rings $c$. In some instances it may be desirable to form the ribs $e'$ so as to have a slight elasticity, and in that event this modification would afford the additional advantage of having the clearances $f'$ also reducible by the application of steam pressure from the right.

The modification exhibited in Fig. 4 is similar to the modification in Fig. 3 but in this case certain of the ribs $e'$ are replaced by the elastic rings $k$, the latter being firmly secured and anchored to the housing $j$ by means of suitable tightening rings $b'$. The elastic rings $k$ are formed similarly to the elastic rings $c$ and have their elastic or free inner edges given a slight inclination opposed to the inclination of the rings $e'$. According to this arrangement, therefore, all the clearances, $f, f'$, and $g'$ are automatically reduced upon the application of steam pressure from the right, thereby obtaining a treble automatic seal at each gland element followed by an expansion chamber.

In all the modifications there are indicated a multiplicity of these gland elements and the number of them may be varied to suit the particular requirements depending upon pressure and the capacity of the turbine or other rotating machine of high pressure to which the invention is to be applied. It is preferable to make the gland elements, especially the rings $c$ and $k$, of rust proof material.

The invention is applicable to all types of apparatus requiring glands of this general type, such as blowers, compressors, pumps and turbines, but especially high pressure machines of the elastic fluid type such as high pressure steam turbines.

Having thus described my invention, what I claim and desire to protect by Letters Patent is:

A gland construction for rotating shafts comprising a set of gland rings axially spaced to form a succession of chambers and a second set of gland rings projecting into and dividing said chambers unequally, each ring of the second set normally lying more closely adjacent to one of a pair of gland rings of the first set defining a specific chamber than the other of said rings to form therewith an elongated narrowed axial throttling clearance on one side with a comparatively larger non-throttling clearance on the other side. the set of said gland rings which is disposed on the higher pressure side of such throttling clearances being elastic to be movable with steam presure variations and thereby vary the elongated axial throttling clearances a substantial amount.

In testimony whereof, I have signed my name to this specification.

FRANZ LÖSEL.